(12) United States Patent
Hasegawa et al.

(10) Patent No.: US 6,623,826 B2
(45) Date of Patent: Sep. 23, 2003

(54) PASSIVE INTERMODULATION FREE MULTILAYER THERMAL BLANKET

(75) Inventors: Mark Hasegawa, Mountain View, CA (US); Mary Owings, Castro Valley, CA (US)

(73) Assignee: Space Systems/Loral, Palo Alto, CA (US)

( * ) Notice: Subject to any disclaimer, the term of this patent is extended or adjusted under 35 U.S.C. 154(b) by 54 days.

(21) Appl. No.: 10/020,704

(22) Filed: Oct. 29, 2001

(65) Prior Publication Data

US 2003/0082332 A1 May 1, 2003

(51) Int. Cl.⁷ .................................................. B32B 3/10
(52) U.S. Cl. .............................. 428/44; 428/57; 428/68; 428/122; 428/138; 244/158 A
(58) Field of Search ........................... 428/122, 68, 44, 428/57, 76, 138; 244/117 A, 158 A

(56) References Cited

U.S. PATENT DOCUMENTS 5,626,314 A * 5/1997 Reynolds et al. ....... 244/158 A

* cited by examiner

*Primary Examiner*—Alexander S. Thomas
(74) *Attorney, Agent, or Firm*—Kenneth W. Float

(57) ABSTRACT

Thermal apparatus that reduces passive intermodulation products generated on a satellite or other spaceborne vehicle. Exemplary passive intermodulation free thermal blankets comprise a reflector stack including multiple polyimide layers with metallized film on one side thereof, a binding layer that secures the reflector stack together, and an outer cover layer that wraps around the binding layer and reflector stack to cover an outer surface of the thermal blanket and form a hem on an inner surface of the thermal blanket. Multiple small thermal blankets or patches may be bound together using grounding inserts and polyimide tape to form a quilt-like assembly. The quilt-like assembly is enclosed by an outer cover layer that wraps around the multiple patches to cover one surface thereof and form a hem on an opposite surface thereof.

20 Claims, 4 Drawing Sheets

PASSIVE INTERMODULATION FREE MULTILAYER THERMAL BLANKET

BACKGROUND

The present invention relates generally to satellites, and more particularly, to improved passive intermodulation free multilayer thermal blankets for use on satellites.

Typical hardware components employed on satellites must be made "passive intermodulation (PIM) free" by adjusting component design and careful inspection of workmanship. Items that have been known to cause passive intermodulation, such as intermittent metal contacts, corrosion, metal or metal-graphite joints, and untightened or loose connections, for example, must be eliminated from the hardware components by design or careful quality inspection of the hardware and PIM testing at the satellite level. However, typical conventional thermal blankets generate significant passive intermodulation products.

It is an objective of the present invention to provide for improved passive intermodulation free multilayer thermal blankets for use on satellites.

SUMMARY OF THE INVENTION

The present invention provides for an improved passive intermodulation free multilayer thermal blankets and assemblies thereof. The passive intermodulation free multilayer thermal blankets and assemblies may be advantageously used as components on satellites and other spaceborne vehicles.

A first exemplary passive intermodulation free thermal blanket Comprises multiple layers of reinforced, carbon-loaded polyimide sheets followed by thin polyimide or polyester sheets with metallized film (aluminum) applied on one side only. The metallized sides of the polyimide or polyester sheets are oriented in a single direction so that no metallized film layers touch each other. The metallized film layers are bound together with a combination of polyimide tape, aluminum foil tape with conductive adhesive, and carbon loaded polyimide film. The carbon containing polyimide sheets are placed over the metallized sheets and wrapped around the metallized layup to form a hem on the back side of the blanket. Films are perforated with the exception of the outermost metallized layer to allow for venting of the thermal blanket.

A second exemplary passive intermodulation free thermal blanket comprises multiple layers of reinforced, carbon-loaded polyimide sheets covering thin polyimide or polyester sheets with metallized film (aluminum) applied on one side only. The metallized sides of the polyimide or polyester sheets are oriented in a single direction so that no metallized film layers touch each other. The thin metallized film sheets are sized in relatively small patches whose edges are individually bound with a combination of polyimide tape, aluminum foil tape with conductive adhesive, and a carbon-loaded polyimide film. The metallized patches each have a carbon-loaded polyimide grounding insert and are assembled together to form a quilt of patches, with each patch electrically grounded to the next adjacent patch through the grounding insert. Carbon-loaded polyimide films (outer covers) cover the entire patch-quilt assembly. The carbon containing polyimide outer covers are placed over the metallized sheets and wrap around the metallized quilt to form a hem on the back side of the blankets. Films are perforated with the exception of the outermost metallized layer to allow for venting of the thermal blanket.

The present thermal blankets do not generate passive intermodulation in and shield underlying passive intermodulation generating hardware from environments containing high intensity UHF (300 MHz) through Ka (30 GHz) RF fields at low orders of passive intermodulation. The thermal blankets shield underlying passive intermodulation generating hardware from environment thereby preventing passive intermodulation generation.

The thermal blankets also provide thermal insulation equivalent or better than standard conventional thermal blankets. In addition, the thermal blankets are resistant from UHF passive intermodulation generation after damage from on-orbit mechanical degradation from impacts with micrometeoroids or orbital debris or damage from thermal cycling or radiation.

The design of the thermal blanket allows for internal venting without risk of passive intermodulation generation. The thermal blankets have increased durability, has low mass, and is tailorable to shield against different RF frequencies and intensities.

The size and configuration of thermal blanket components reduces the risk of generating increased passive intermodulation products from damage caused by in orbit degradation, through orbital debris impact, and damage caused by radiation and thermal cycling. The configuration of the thermal blankets allow quick, easy, and low cost manufacturing of blankets and reduced number of electrostatic discharge grounding tads from the blankets.

The thermal blankets allow the use of hardware that normally would generate passive intermodulation products without costly, intensive, and time consuming inspection and testing. Because the thermal blankets shield the underlying hardware from the RF environment, subsystem and individual passive intermodulation testing of flight hardware may not be necessary

BRIEF DESCRIPTION OF THE DRAWINGS

The various features and advantages of the present invention may be more readily understood with reference to the following detailed description taken in conjunction with the accompanying drawing figure, wherein like reference numerals designate like structural elements, and in which.

DETAILED DESCRIPTION

Figure 1:
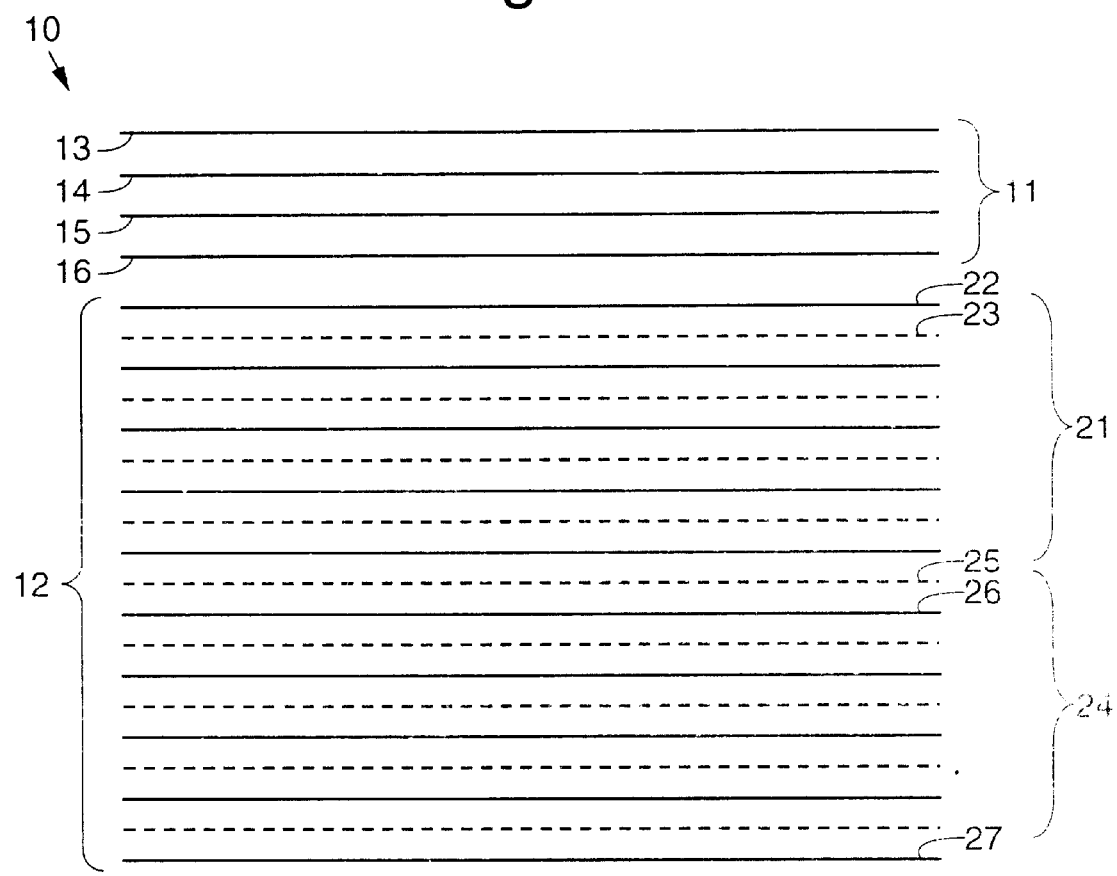
FIG. 1 is an exploded view of a first exemplary embodiment of a passive intermodulation free thermal blanket in accordance with the principles of the present invention.

Referring to the drawing figures, FIG. 1 is an exploded view illustrating details of a first exemplary embodiment of a passive intermodulation free thermal blanket 10 in accordance with the principles of the present invention. The first exemplary thermal blanket 10 comprises a reflector stack 12 that includes an innermost layer 27 comprising a reinforced, single sided metallized (aluminum) polyimide sheet 27, which may be a 0.5 mil sheet of perforated reinforced polyimide. The reflector stack 12 further comprises a plurality (five, for example) of polyester layers 24 comprising Dacron polyester sheets 25 separated by intervening metallized layers 26 comprising 0.25 mil thick, single sided metallized (aluminum) polyester that are disposed adjacent to the innermost layer 27.

The reflector stack 12 further comprises a plurality of (five, for example) reinforced, carbon-loaded polyimide layers 21 comprising 0.3 mil thick, single sided metallized (aluminum) polyimide layers 22 that are separated by intervening glass tissue layers 23, which are disposed adjacent to the plurality of polyester layers 24 comprising the Dacron polyester and polyester layers 25, 26.

The first exemplary thermal blanket 10 comprises an outer cover system 11 that is comprised of a plurality of (four, for example) reinforced, carbon-loaded polyimide layers 13, 14, 15, 16. The exemplary cover system 11 comprises a 1.0 mil single sided metallized (aluminum) nonperforated black polyimide layer 16, a 1.9 mil thick, perforated carbon loaded polyimide layer 15 having 230 ohms/sq, a 1.6 mil thick, reinforced perforated carbon loaded polyimide layer 14 having 400 ohms/sq., and a 1.0 mil thick, reinforced, perforated, carbon loaded, outer polyimide layer 13 having $10^7$ ohms/sq. When installed on a satellite or other spaceborne vehicle, the reinforced perforated outer polyimide layer 13 is oriented toward space.

The thermal blanket 10 thus comprises multiple layers of reinforced, carbon-loaded polyimide sheets 13, 14, 15, 16, 22, 23 followed by thin polyimide or polyester sheets 25 with metallized film layers 26 (aluminum) applied on one side only. The metallized film layers 26 of the polyimide or polyester sheets 25 are oriented in a single direction so that no metallized film layers 26 touch each other. The metallized film layers 26 are bound together with a combination of polyimide tape, aluminum foil tape with conductive adhesive, and carbon loaded polyimide film. The carbon containing polyimide sheets are placed over the metallized sheets and wrapped around the metallized layup to form a hem on the back side of the blanket 10. Films are perforated with the exception of the outermost metallized layer to allow for venting of the thermal blanket.

Figure 2:
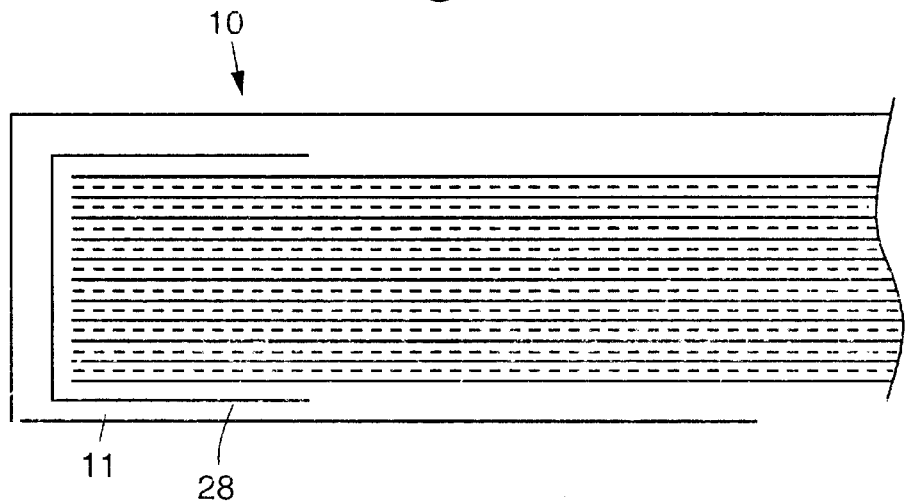
FIG. 2 illustrates a portion of an assembled passive intermodulation free thermal blanket constructed as shown in FIG. 1.

FIG. 2 illustrates a portion of a fully assembled passive intermodulation free thermal blanket 10 constructed as shown in FIG. 1. The reflector stack 12 shown in FIG. 1 is bound with a binding layer 28 that is a combination of layers comprising polyimide tape, aluminum foil tape with conductive adhesive, and carbon loaded polyimide film. The outer cover system 11 surrounds the binding layer 28 and reflector stack 12.

Figure 3:
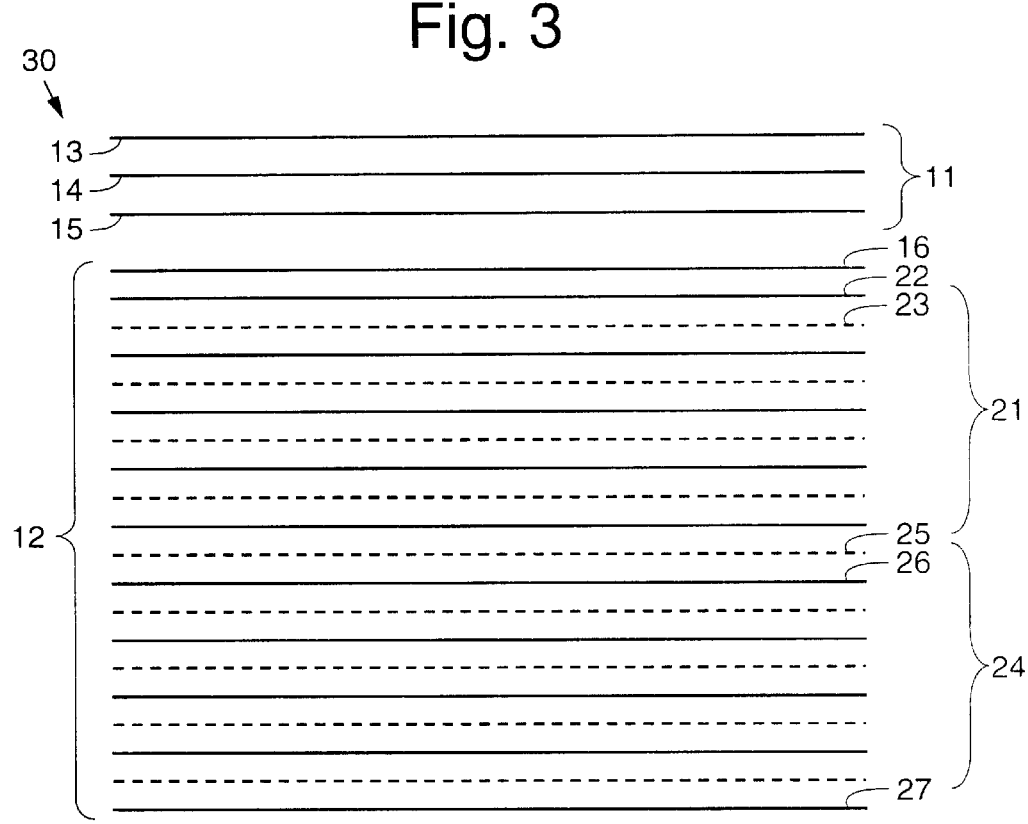
FIG. 3 is an exploded view showing the construction of an exemplary embodiment of a passive intermodulation free thermal blanket quilt patch in accordance with the principles of the present invention.

FIG. 3 is an exploded view showing the construction of an exemplary embodiment of a passive intermodulation free thermal quilt patch 30 in accordance with the principles of the present invention. The construction of the thermal blanket quilt patch 30 is substantially the same as the construction of the thermal blanket 10 shown in FIG. 1, with several minor exceptions.

The thermal blanket quilt patch 30 comprises a reflector stack 12 that includes an innermost layer 27 comprising a reinforced, polyimide sheet 27, which may be a 0.5 mil sheet of perforated reinforced polyimide. The reflector stack 12 further comprises a plurality (five, for example) of polyester layers 24 comprising Dacron polyester sheets 25 separated by intervening metallized layers 26 comprising 0.25 mil, single sided metallized (aluminum) polyester that are disposed adjacent to the innermost layer 27.

The reflector stack 12 further comprises a plurality of (five, for example) reinforced, carbon-loaded polyimide layers 21 comprising 0.3 mil metallized (aluminum) polyimide layers 22 that are separated by intervening glass tissue layers 23. which are disposed adjacent to the plurality of polyester layers 24 comprising the Dacron polyester and polyester layers 25, 26. A 1.0 mil thick, single sided metallized nonperforated carbon loaded polyimide layer 16 is placed over the reflector stack 12 to form a hem.

The thermal blanket quilt patch 30 is thus comprised of multiple layers of reinforced, carbon-loaded polyimide sheets 16, 22, 23 covering thin polyimide or polyester sheets 25 with metallized film layers 26 (aluminum) applied on one side only. The metallized film layers 26 of the polyimide or polyester sheets 25 are oriented in a single direction so that no metallized film layers 26 touch each other.

Figure 4:
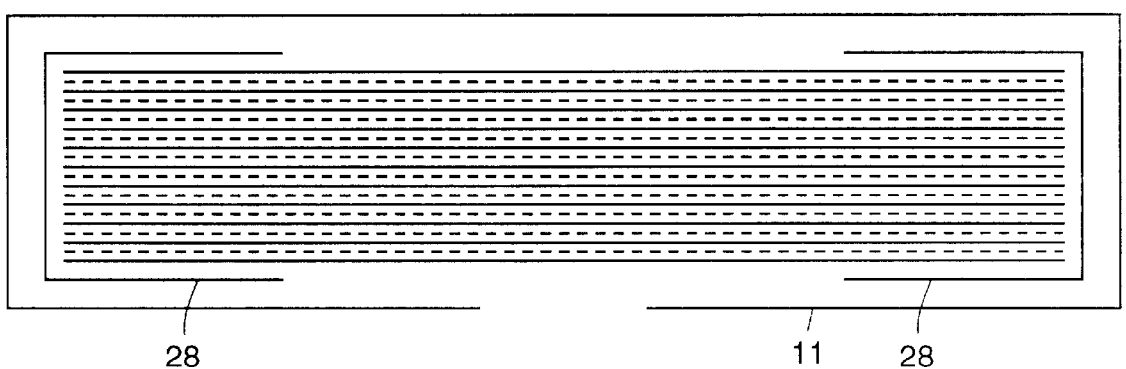
FIG. 4 illustrates the construction of an assembled passive intermodulation free patch.

FIG. 4 illustrates the construction of an assembled passive intermodulation free patch 30. The thin metallized film (aluminum) sheets are configured as small patches 30 whose edges are individually bound with a binding layer 28 combination of polyimide tape, aluminum foil tape with conductive adhesive, and a carbon-loaded polyimide film. The outer patch cover 16 surrounds the binding layer 28 and reflector stack 12.

Figure 5:
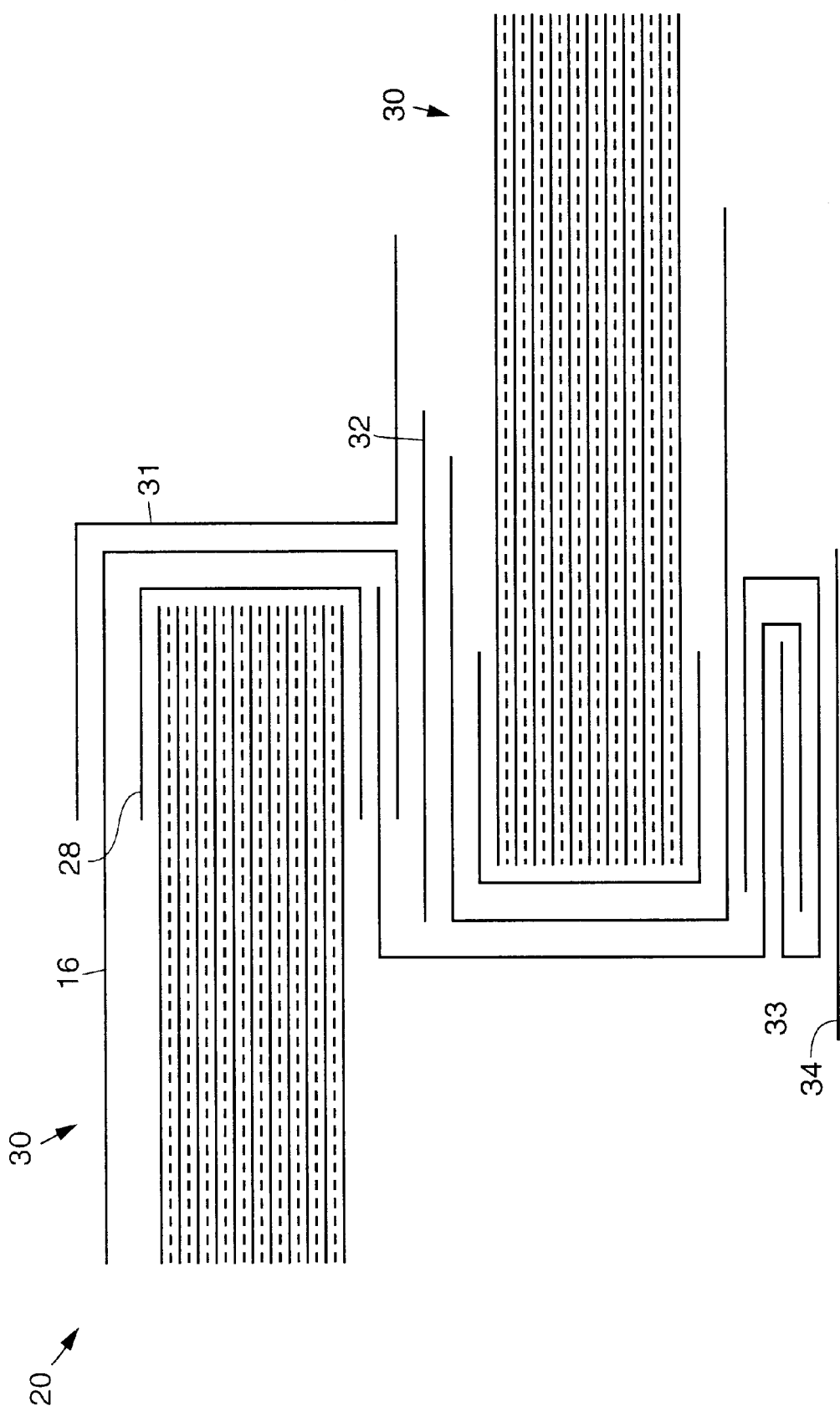
FIG. 5 illustrates bonding of passive intermodulation free patches.

FIG. 5 illustrates bonding of passive intermodulation free patches 30. Two patches 30 are shown that have a carbon-loaded polyimide grounding insert 33 or joint 33 that contact adjacent and overlapping ends of the patches 30. A layer of polyimide tape 32 is disposed between the patches 30 to isolate them. Polyimide tape 31 is used to bond the patches 30 together. A layer of polyimide tape 34 covers the grounding inserts 33. Thus, the metallized patches 30 each have a carbon-loaded polyimide grounding insert 33 and are assembled together to form a quilt 20 of patches 30, with each patch 30 electrically grounded to the next adjacent patch 30 through the grounding insert 33. The overlap between the two patches 30 can range from 0 to a dimension required to provide capacitive coupling (2 inches, for instance)

Figure 6:
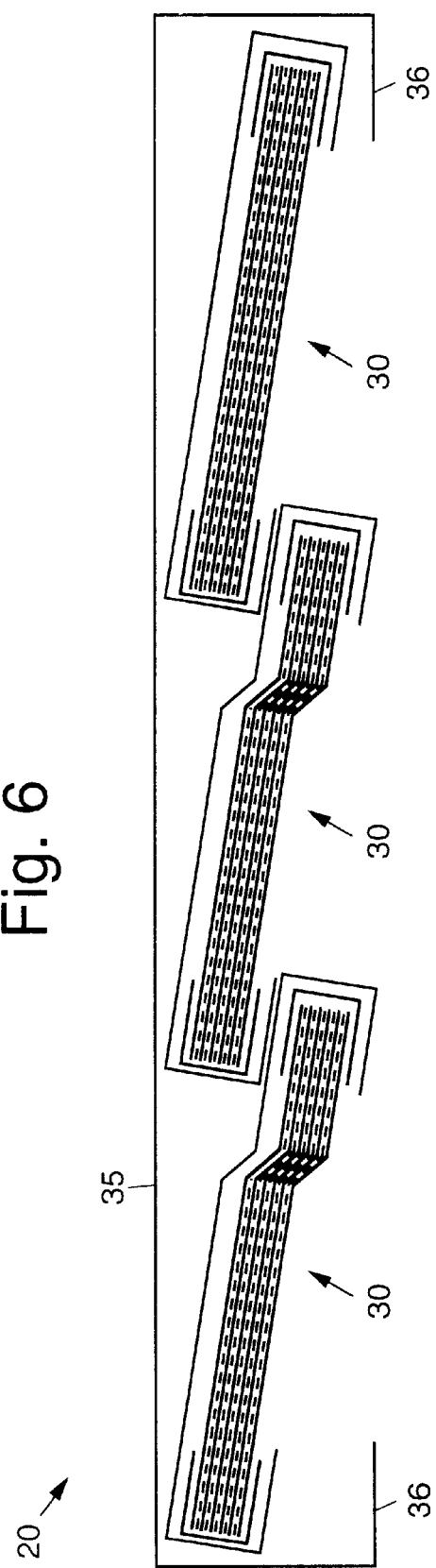
FIG. 6 illustrates a passive intermodulation free thermal blanket quilt.

FIG. 6 illustrates a passive intermodulation free thermal blanket quilt 20. FIG. 6 illustrates three patches 30 that overlap each other at respective adjacent ends. An outer cover 35 comprising carbon-loaded polyimide film is disposed to cover the patch-quilt 20 and is comprised of a plurality (three, for example) of reinforced, carbon-loaded polyimide layers 13, 14, 15. The exemplary cover system 11 comprises a 1.9 mil perforated polyimide layer 15 having 230 ohms/sq, a 1.6 mil reinforced perforated polyimide layer 14 having 400 ohms/sq, and a 10 mil reinforced perforated outer polyimide layer 13 having $10^7$ ohms/sq.

When installed on a satellite or other spaceborne vehicle, the reinforced perforated outer polyimide layer 13 is oriented toward space. The carbon containing polyimide outer cover 35 is placed over the metallized sheets and wrap around the patches 30 of the metallized quilt 20 to form a hem 36 on the back side of the thermal blanket patches 30. Films or layers of the quilt 20 are perforated with the exception of the outer metallized cover 35 to allow for venting of the thermal blanket quilt 20.

Thus, improved passive intermodulation free multilayer thermal blankets for use on satellites have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. Passive intermodulation free thermal blanket apparatus comprising:
   a reflector stack comprising multiple polyimide layers having metallized film on one side thereof;
   a binding layer that secures the reflector stack together; and
   outer cover layers that wrap around the binding layer and reflector stack to cover an outer surface of the thermal blanket and form a hem on an inner surface of the thermal blanket.

2. The thermal blanket recited in claim 1 wherein the metallized film layers are oriented in a single direction so that they do not touch each other.

3. The thermal blanket recited in claim 1 wherein the binding layer comprises layers of polyimide tape, aluminum foil tape with conductive adhesive, and carbon loaded polyimide film.

4. The thermal blanket recited in claim 1 wherein the layers of the reflector stack are perforated to allow for venting of the thermal blanket.

5. The thermal blanket recited in claim 1 wherein the outermost metallized layer of the outer cover layers is non perforated.

6. Passive intermodulation free thermal blanket apparatus comprising:
   a reflector stack comprising multiple polyester layers having metallized film on one side thereof;
   a binding layer that secures the reflector stack together; and
   outer cover layers that wrap around the binding layer and reflector stack to cover an outer surface of the thermal blanket and form a hem on an inner surface of the thermal blanket.

7. The thermal blanket recited in claim 6 wherein the metallized film layers are oriented in a single direction so that they do not touch each other.

8. The thermal blanket recited in claim 6 wherein the binding layer comprises layers of polyimide tape, aluminum foil tape with conductive adhesive, and carbon loaded polyimide film.

9. The thermal blanket recited in claim 6 wherein the layers of the reflector stack are perforated to allow for venting of the thermal blanket.

10. The thermal blanket recited in claim 6 wherein the outermost metallized layer of the outer cover layers is non perforated.

11. Passive intermodulation free thermal blanket apparatus comprising:
    a plurality of overlapping passive intermodulation free thermal blanket patches that each comprise a reflector stack comprising multiple polyimide layers having metallized film on one side thereof, a binding layer that secures the reflector stack together, and an outer cover layer that wraps around the binding layer and reflector stack to cover an outer surface of the thermal blanket and form a hem on an inner surface of the thermal blanket;
    one or more grounding inserts that contact adjacent overlapping ends of the patches;
    a layer of polyimide disposed between the patches to isolate them;
    a layer of polyimide that bonds the patches together; and
    outer cover layers that wrap around the plurality of patches to cover an outer surface of the thermal blanket apparatus and form a hem on an inner surface of the thermal blanket apparatus.

12. The apparatus recited in claim 11 wherein the metallized film layers are oriented in a single direction so that they do now touch each other.

13. The apparatus recited in claim 11 wherein the binding layer comprises layers of polyimide tape, aluminum foil tape with conductive adhesive, and carbon loaded polyimide film.

14. The apparatus recited in claim 11 wherein the layers of the reflector stack are perforated to allow for venting of the thermal blanket.

15. The apparatus recited in claim 11 wherein the metallized outer cover layer that wraps around the patch binding layer and reflector stack is non perforated.

16. Passive intermodulation free thermal blanket apparatus comprising:
    a plurality of overlapping passive intermodulation free thermal blanket patches that each comprise a reflector stack comprising multiple polyester layers having metallized film on one side thereof, a binding layer that secures the reflector stack together, and an outer cover layer that wraps around the binding layer and reflector stack to cover an outer surface of the thermal blanket and form a hem on an inner surface of the thermal blanket;
    one or more grounding inserts that contact adjacent overlapping ends of the patches;
    a layer of polyimide disposed between the patches to isolate them,
    a layer of polyimide that bonds the patches together; and
    an outer cover layer that wraps around the plurality of patches to cover an outer surface of the thermal blanket apparatus and form a hem on an inner surface of the thermal blanket apparatus.

17. The apparatus recited in claim 16 wherein the metallized film layers are oriented in a single direction so that they do not touch each other.

18. The apparatus recited in claim 16 wherein the binding layer comprises layers of polyimide tape, aluminum foil tape with conductive adhesive, and carbon loaded polyimide film.

19. The apparatus recited in claim 16 wherein the layers of the reflector stack are perforated to allow for venting of the thermal blanket.

20. The apparatus recited in claim 16 wherein the metallized outer cover layer that wraps around the patch binding layer and reflector stack is nonperforated.

* * * * *